United States Patent [19]
Piety et al.

[11] Patent Number: 5,875,420
[45] Date of Patent: Feb. 23, 1999

[54] DETERMINING MACHINE OPERATING CONDITIONING BASED ON SEVERITY OF VIBRATION SPECTRA DEVIATION FROM AN ACCEPTABLE STATE

[75] Inventors: Kenneth R. Piety; William F. Bethmann, Jr., both of Knoxville, Tenn.

[73] Assignee: CSI Technology, Inc., Wilmington, Del.

[21] Appl. No.: 874,334

[22] Filed: Jun. 13, 1997

[51] Int. Cl.$^6$ .............. G01F 15/00; G01M 7/00; G01M 13/00
[52] U.S. Cl. .............. 702/182; 702/56; 702/76; 364/474.16; 364/528.15; 340/683
[58] Field of Search .................. 702/182–185, 702/56, 77, 199, 76; 364/474.16–474.19, 528.15; 73/579, 602, 660; 340/635, 683

[56] References Cited

U.S. PATENT DOCUMENTS

| | | | |
|---|---|---|---|
| 4,322,976 | 4/1982 | Sisson et al. | 73/659 |
| 4,408,285 | 10/1983 | Sisson et al. | 364/508 |
| 4,435,770 | 3/1984 | Shiohata et al. | 364/528.14 |
| 4,493,042 | 1/1985 | Shima et al. | 364/507 |
| 4,683,542 | 7/1987 | Taniguti | 702/56 |
| 4,758,964 | 7/1988 | Bittner et al. | 702/34 |
| 4,885,707 | 12/1989 | Nichol et al. | 364/551.01 |
| 4,980,844 | 12/1990 | Demjanenko et al. | 364/474.19 |
| 5,094,107 | 3/1992 | Schoch | 73/570 |
| 5,251,151 | 10/1993 | Demjanenko et al. | 702/56 |
| 5,511,422 | 4/1996 | Hernandez | 73/593 |
| 5,602,757 | 2/1997 | Haseley et al. | 364/474.19 |
| 5,602,761 | 2/1997 | Spoerre et al. | 364/554 |

*Primary Examiner*—Louis Arana
*Assistant Examiner*—Bryan Bui
*Attorney, Agent, or Firm*—Luedeka, Neely & Graham, P.C.

[57] ABSTRACT

The operational condition of a machine is evaluated when the machine's vibration spectrum deviates from an acceptable state, where an acceptable state is defined by an alarm limit envelope. The amplitude of individual peaks within the machine's vibration spectrum is compared to the alarm limit envelope, and a deviation severity value characterizing the severity of the machine's deviation from an acceptable state is determined for each deviating peak. The deviation severity value represents the severity of deviation when at least one individual peak within the machine's vibration spectrum exceeds the alarm limit envelope. The deviation severity value is obtained by determining the peak excess magnitude for each vibration peak, where the peak excess magnitude is the amount by which the amplitude of each deviating vibration peak exceeds the alarm limit envelope level. The peak excess magnitude is then normalized by a frequency-dependent normalization factor. The ratio of the peak excess magnitude to the alarm limit envelope level for each vibration peak is determined. The deviation severity value for the spectral feature under analysis is then determined by selecting the larger of the severity value based on the excess magnitude and the severity value based on the excess ratio. The deviation severity of individual peaks as well as complex features within machine vibration spectra, such as individual peaks and families of harmonic and sideband peaks, may be determined as well to provide information concerning individual fault conditions.

9 Claims, 7 Drawing Sheets

DETERMINING MACHINE OPERATING CONDITIONING BASED ON SEVERITY OF VIBRATION SPECTRA DEVIATION FROM AN ACCEPTABLE STATE

TECHNICAL FIELD

The present invention relates generally to monitoring the operational condition of a machine, and specifically to a method and apparatus for determining a deviation value that is representative of the operational condition of a machine when the machine's vibration spectrum deviates from an acceptable state.

BACKGROUND OF THE INVENTION

Every machine which contains rotating elements, such as bearings, shafts, and gears, exhibits reasonable levels of vibration which are characteristic of its normal operation. Based upon knowledge of the rotational speed of individual machine elements, machine maintenance personnel can monitor the machine's vibration level at certain characteristic frequencies to acquire an indication of the overall condition of the machine. As the mechanical integrity of a machine element begins to degrade, the vibration level associated with that element changes from its normal characteristic level, indicating to the machine maintenance personnel that corrective action will soon be necessary. By implementing a machine monitoring program, the machine's vibration levels can be measured on a regular schedule, and early detection of abnormal machine operation is possible. With such early warning, repair of the machine may be scheduled well before a machine breakdown and the associated work stoppage occurs. In this manner, machine "down-time" may be scheduled well in advance so as to minimize the impact on manufacturing operations.

A machine monitoring program typically includes dozens or even hundreds of rotating machines. For each of these machines, vibration spectra are typically collected at a number of locations on the machine. Specific spectral features in the measured data may include harmonic families or difference families, which are associated with certain types of machinery faults. From this collected data, an analyst determines which machines are operating with a fault condition. For the machines that are in fact operating with a fault condition, the type of fault, its location, and its severity must be determined. After the severity of the individual faults on a machine are identified and ranked, the severities of all of the machines included in the machine monitoring program which have been identified with a fault condition are then ranked relative to each other. This relative ranking aids the maintenance technician in identifying those machines that are in the greatest danger of a catastrophic failure so that action may be taken in the appropriate time period. Relative rankings also enable the technician to observe whether a particular machine's performance is improving or degrading compared to previous measurements.

One well-known method of determining a measure of severity for a machine's vibration spectrum involves comparison of the spectral overall value to a chart which defines acceptable overall vibration levels for rotating machines. For example, the Rathbone chart provides an allowable level of overall vibration that a machine can exhibit by ranking the machine's operating condition from extremely smooth to very rough in nine incremental steps. One weakness to this approach is that there are machinery faults, such as bearing defects, that generate only small changes in the overall power of a vibration spectrum. In addition, observing only the overall changes in vibration level gives little, if any, indication as to the exact type of fault that is present. Without knowing the type of fault that is present, an accurate measure of machine fault severity is typically not possible. Another significant weakness of this prior approach is that it does not consider the design of the machinery. The physical design and configuration of a machine determines the frequencies at which vibration peaks will exist under normal operation. By making no attempt to examine individual peaks, this prior method is generally unable to isolate which component of the machine has caused an overall increase in the vibration power.

Another known method of determining fault severity based upon a machine's vibration spectrum involves the calculation of values that represent the amount of energy present in certain regions, or bands, of the vibration spectrum. Several of these analysis parameter bands may be specified, each with an associated alarm limit to which a calculated parameter value can be compared. The machine's fault severity can be crudely characterized by examining the deviation of the calculated values from their associated alarm limit, with a severity value in the range of A–D assigned for each band.

One problem associated with the analysis parameter band method is imprecision. Machinery faults do not necessarily generate significant changes in the overall energy of a particular band of a vibration spectrum. Moreover, examining the energy of a particular band of a spectrum still does not provide detailed information about the peaks themselves. As a result, this approach also gives little information as to the type of fault that is present. Once such a scheme has indicated that there is a significant increase in vibration levels in particular bands, an analysis of the peaks must still be performed manually to isolate the cause of the fault. Such manual peak analysis is a tedious and time consuming task.

Other existing predictive vibration monitoring systems typically report that a machine's vibration level has exceeded a limit level, and that the severity of the reported fault falls into one of a few categories of severity, such as "slight", "moderate", "serious", or "extreme". However, in order to adequately rank the severity of fault conditions, it is desirable to assign a value to the fault severity. Such a value, which allows differentiation of fault severity based on incremental differences between the severity values assigned to different vibration spectra, provides for a continuous ranking method. The severity value provides more useful information to an analyst than that provided by a scheme which simply lumps fault severity into broad categories. Also, if a fault severity value is assigned to a particular vibration spectrum of a particular machine, this value is available to the analyst for later comparison against subsequent vibration measurements on the same machine. A history of such directly comparable fault severity values gives an indication as to whether or not an abnormal condition is worsening.

Generally, machine fault conditions generate vibration peaks at specific frequencies, or more commonly, in a group or groups of related frequencies. Peaks occurring at harmonic frequencies and sideband (difference) frequencies are examples of complex features that can be directly related to specific machine fault conditions. Since vibration energy associated with a particular machine fault can be contained in an individual peak, as well as being distributed throughout the harmonic and sideband peaks, it is advantageous for the vibration analyst to have an indication of the severity of the features based on the total power contained in these spectral features. By monitoring the changes in the power contained in these specific spectral features, the analyst can assess whether the particular machine fault is worsening.

The known methods of specifying machine fault severity based on vibration spectra have not provided for the determination of the severity of faults associated with such specific spectral features within a vibration spectrum. The methods which consider only the overall increase in power across a complete spectrum provide little useful information about specific component faults. Those methods which detect vibration energy increases in particular bands in the spectrum do not differentiate between the peaks associated with different fault families that may fall within the same band.

In addition, prior fault severity determination schemes have not considered both the extent to which a peak level exceeds an alarm limit level and the ratio of this deviation magnitude to the limit level applied to the peak. The determination of fault severity values that are based on both peak excess magnitude and peak excess ratio enable determination of an accurate level of severity for peaks that are produced as a result of different types of fault conditions. This is desirable since some fault conditions can result in rather large changes in the energy of the peaks associated with the given fault, but generally small changes in excess ratio. An example of such a fault is rotor imbalance. When a machine is operating normally, with a balanced rotor, there is usually a significant vibration peak present at the running speed of the machine where most of the spectral vibration energy is concentrated. If the rotor becomes imbalanced, although the energy in the vibration peak may increase significantly, the ratio of this increase to the original level may not appear significant. However, if absolute levels are considered, the increase could be considerable. For example, if the original peak was 0.5 in/sec, and another 0.25 in/see is added due to a rotor imbalance, then the excess magnitude may be of significance since all of the energy associated with this fault is focused at a single frequency. Therefore, it is desireable to consider both the magnitude of the excess level as well as the ratio of the excess in order to accurately evaluate the severity of faults whose energy is concentrated at a single peak.

On the other hand, some fault conditions, such as bearing defects, result in large changes in the ratio of the excess to its envelope alarm limit, even though the change in the power of the excess was relatively small. With bearing defects, a high change in ratio results since peaks associated with bearing defect frequencies, which are not present when a machine is operating normally, appear in the measured test data. Thus, if a peak of even slight significance is suddenly present at a bearing defect frequency, the ratio of its value compared to its envelope alarm limit value will be significant. Therefore, the ratio of the excess vibration level to the limit level, as well as the excess magnitude should be taken into account when determining a fault severity value.

In order to provide an accurate assessment of fault severity, the frequency of the vibration peak under analysis should be considered. At higher frequencies, the machine feels the excessive vibration levels more often per shaft revolution. More specifically, since more oscillations occur in a given amount of time, the acceleration which is generated by these additional direction changed will increase. The acceleration of a machine is directly proportional to the force that it feels, and this force is what actually damages machinery components. However, prior fault severity determination schemes have not considered the frequency of the excess vibration peak when assigning a severity level. These prior schemes have not provided for normalizing the excess vibration level as a function of the vibration frequency prior to calculating the severity of the excess.

Therefore, considering the foregoing deficiencies in prior predictive machine vibration monitoring schemes, a need exists for a predictive vibration monitoring system which accounts for the magnitude of an excess vibration peak amplitude as well as the ratio of the excess peak amplitude to a limit amplitude. A need also exists for a predictive vibration monitoring system that provides for determination of the fault severity of individual fault conditions that may be manifested as individual peaks, or families of related peaks, within the vibration spectrum. A further need exists for a predictive vibration monitoring system that normalizes the magnitude of the excess vibration level on a frequency-dependent basis prior to determining a severity value for the excess. A need also exists for a predictive vibration monitoring system which determines a fault severity value for a vibration spectrum which, on an incremental scale, indicates the severity of fault conditions such that fault severities of several machines may be ranked. There is also a need for a predictive vibration monitoring system which provides for the analysis of vibration peaks which fall into particular regions of a vibration spectrum so that particular fault modes are isolated. In addition, a need exists for a predictive vibration monitoring system that compares a machine's test vibration spectrum to a limit envelope on an order-normalized basis, so that variations in machine running speed do not affect the fit of the limit envelope to the test vibration spectrum, thus ensuring that specific peaks are compared to the correct alarm limit level.

SUMMARY OF THE INVENTION

Therefore, it is an object of the present invention to provide a method and apparatus for determining the operational condition of a machine.

Another object of the present invention is to provide a method and apparatus for determining the operational condition of a machine by comparing the energy associated with individual peaks and groups of related peaks in a machine's test vibration spectrum to a limit envelope, and determining a fault severity value when individual vibration peaks, or the combined energy associated with the groups of related peaks, exceed the limit envelope.

It is another object of the present invention to provide a method and apparatus for determining a fault severity value for a machine based on an excess vibration level which has been normalized as a function of frequency.

A further object of the present invention is to provide a method and apparatus for determining a fault severity value which provides for observation of incremental changes in the severity of a particular machine fault over time.

Yet another object of the present invention is to provide a method and apparatus for determining a fault severity value which indicates the relative severity of individual faults occurring on the same machine.

It is also an object of the present invention to provide a method and apparatus for analyzing machine vibration peaks which fall into particular regions of a vibration spectrum so that particular fault modes are isolated.

An additional object of the present invention is to provide a method and apparatus for comparing a machine's test vibration spectrum to a limit envelope on an order-normalized basis, so that variations in machine running speed do not affect the fit of the limit envelope to the test vibration spectrum.

Regarding the foregoing and other objects of the invention, the present invention in one aspect evaluates the operational condition of a machine when the machine's vibration spectrum deviates from an acceptable state, where an acceptable state is defined by an alarm limit envelope. The amplitudes of one or more individual peaks within the machine's vibration spectrum are first compared to the alarm limit envelope. Based upon this comparison, a deviation severity value is determined based upon the peaks in the test spectrum which exceed the alarm limit envelope. This deviation severity value characterizes the severity of the machine's deviation from an acceptable state so that faults associated with one or more machines may be ranked. The determination of the deviation severity value is based upon both a peak excess magnitude and a ratio of the peak excess magnitude to the alarm limit envelope level, where the peak excess magnitude is the amount by which the amplitude of each deviating vibration peak within the machine's vibration spectrum exceeds the alarm limit envelope level. The largest deviation severity value of all the deviating peaks across the spectrum is selected as the initial deviation severity value. The final deviation severity value for the spectrum is determined by adding a value of one percent to the initial deviation severity value for each of the other deviating peaks within the vibration spectrum, up to a maximum value of 10 percent being added.

In accordance with another aspect, the invention determines a deviation severity value based at least in part on a normalized peak excess magnitude, where the peak excess magnitude is normalized by a normalization factor which is dependent on the vibration frequency.

The present invention further evaluates the operational condition of a machine by first selecting individual vibration peaks which are members of a harmonic family of peaks within the machine's test vibration spectrum. The peaks chosen for analysis are those whose frequencies are integer multiples of each other. The energy levels associated with the selected vibration peaks are summed, resulting in a sum peak level. The amplitude of the sum peak level is compared to the alarm limit envelope, and a deviation severity value is determined based upon the amount by which the sum peak exceeds the alarm limit envelope. The deviation severity value determined by this aspect of the present invention characterizes the deviation severity of an individual fault condition which can be associated with the identified harmonic family.

In yet another aspect, the present invention evaluates the operational condition of a machine by analyzing individual vibration peaks which are members of a sideband family of peaks within the machine's test vibration spectrum. The peaks chosen for analysis are those whose frequencies are related as difference frequencies. The energy levels associated with the selected sideband peaks are summed, resulting in a sum peak level. The amplitude of the sum peak level is compared to the alarm limit envelope, and a deviation severity value is determined based upon the amount by which the sum peak exceeds the alarm limit envelope. The deviation severity value determined by this aspect of the present invention also characterizes the deviation severity of an individual fault condition, this fault condition being associated with the identified sideband family.

BRIEF DESCRIPTION OF THE DRAWINGS

The invention will now be described in further detail with reference to the drawings, wherein like reference characters designate like or similar elements throughout the several drawings as follows.

DETAILED DESCRIPTION OF THE PREFERRED EMBODIMENTS

Figure 1:
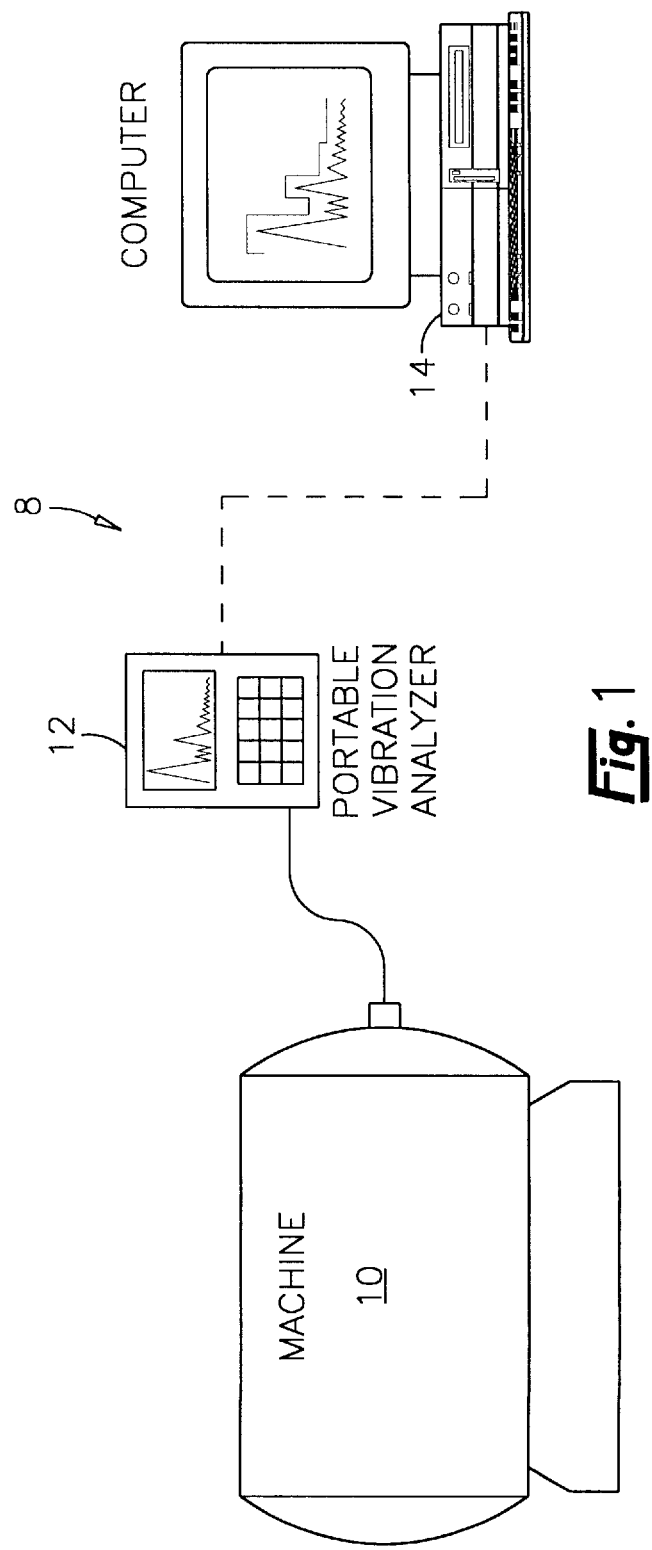
FIG. 1 is a diagram of a machine vibration monitoring system in accordance with the present invention.

A machine vibration monitoring system 8, such as shown in FIG. 1, is used by machine maintenance personnel to measure and analyze the vibration level of a machine 10, such as an AC induction motor. By monitoring the machine's vibration spectra, the operational condition of the machine may be deduced. The system includes a device, such as the portable vibration analyzer 12 shown in FIG. 1, which collects, stores, and analyzes vibration data from several different machines, and a computer 14 which stores and analyzes vibration data, such as data which has been downloaded from the portable vibration analyzer 12.

The typical analysis performed by the portable vibration analyzer 12 or the computer 14 in such a system 8 includes transforming the machine's vibration data into vibration frequency spectra, defining a vibration amplitude limit above which the machine's vibration level is considered abnormal, determining whether the machine's vibration level has exceeded the defined limits, and reporting to the machine maintenance personnel whether the limits have been exceeded by the measured data. The current invention is directed toward a process that provides to an operator a qualitative value which characterizes the severity of an abnormal vibration condition. With this value, the operator can make an informed decision about the priority to assign to the problem.

The vibration amplitude limit, against which the current invention compares the test vibration data, is in the form of a predetermined alarm limit envelope. This envelope, which is expressed as a function of vibration frequency, is derived from vibration data that characterizes a normal (acceptable) operating condition of the machine, or from statistical studies of the vibrational characteristics of a large population of machines, or from theoretical limits established by the machine design, or from a combination of these sources.

Figure 2:
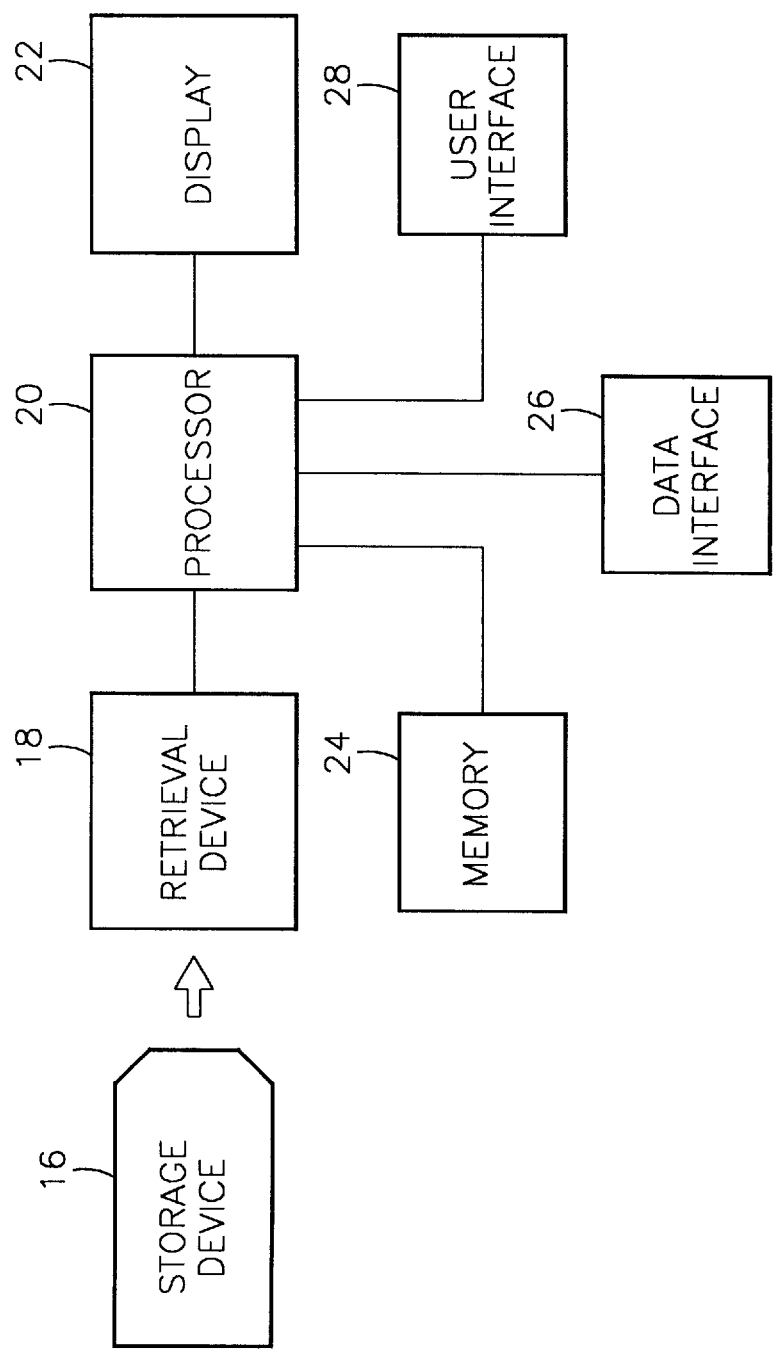
FIG. 2 is a functional diagram showing the components of a device for determining a deviation severity value.

In accordance with a preferred embodiment of the present invention as shown in FIG. 2, data representing a machine's test vibration spectrum is made available to a processor 20 via a data interface 26, or the data may reside in memory 24 where it is readable by the processor 20. Alternatively, the test vibration spectrum data may be downloaded to the processor via a data storage device 16, such as a magnetic disk or tape, and a data retrieval device 18, such as a disk or tape drive. In like manner, data representing an alarm limit envelope is also made available to the processor 20 from a data interface 26, from memory 24, or from the data storage and retrieval devices, 16 and 18. When the test vibration spectrum and the alarm limit envelope have been made available to the processor 20, an operator, by means of a user interface 28, commands the processor 20 to execute a process which compares the machine's test vibration spectrum to the alarm limit envelope. Through a series of steps which are described in greater detail below, this process examines the peak vibration levels in the test vibration spectrum, and determines whether an individual peak level, or the sum of the energy contained in a subset of peaks within the test vibration spectrum, has exceeded the alarm limit envelope. If so, the processor 20 determines a deviation severity value to be assigned to an individual deviating peak, a family of deviating peaks, or the whole test spectrum, and displays the severity values to the operator by means of a display 22. The operator may then prioritize the problem depending on the type of fault indicated and the magnitude of the reported severity values.

In a preferred embodiment of the invention, the processor 20 executes the process steps according to processor instructions which are stored in memory 24. Alternatively, the processor instructions are stored in a storage device 16, such as a magnetic disk or tape, and are retrieved from the storage device 16 by means of a retrieval device 18, such as a disk drive or tape drive, before execution by the processor 20.

Figure 3:
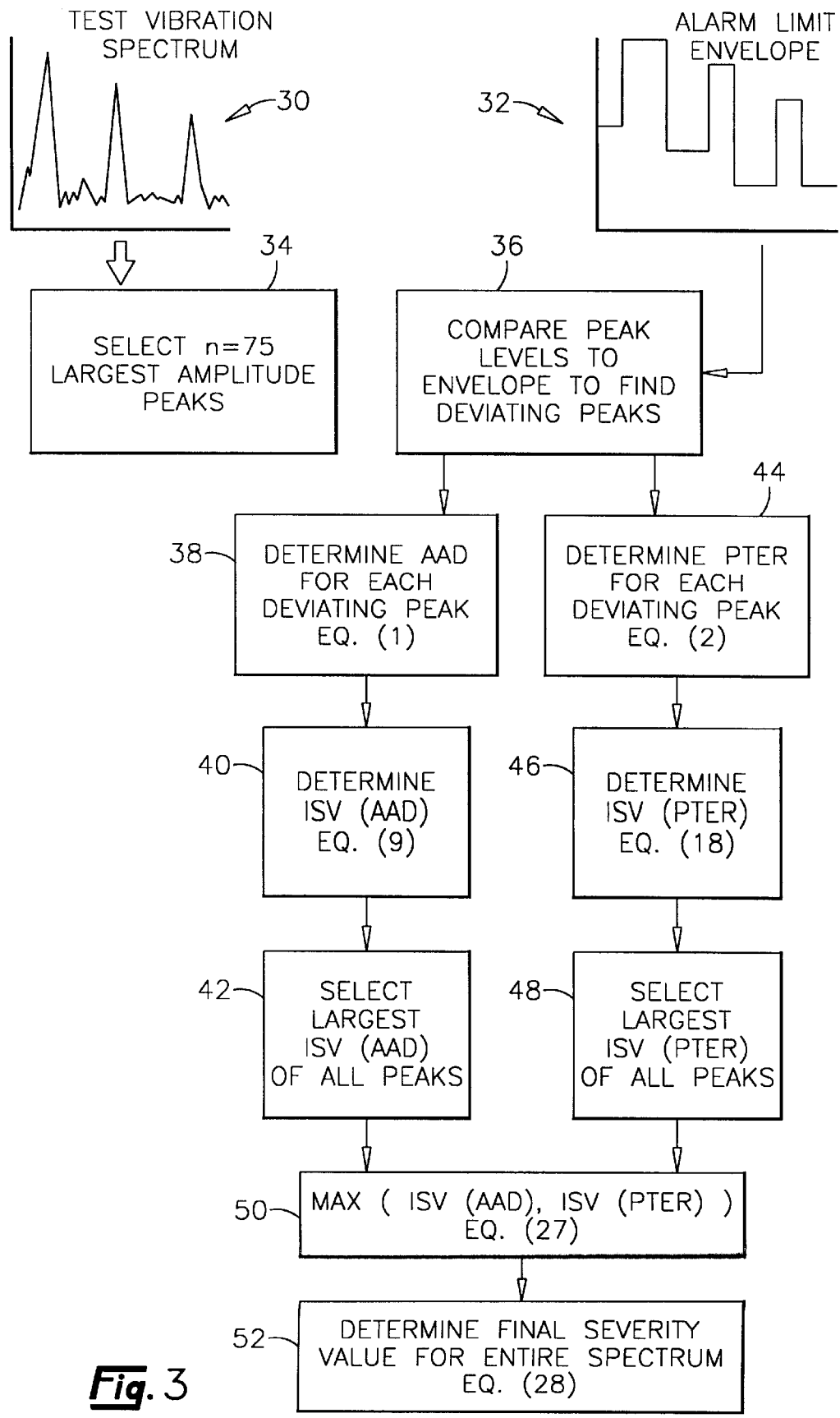
FIG. 3 is a flow diagram of a process for determining deviation severity for a complete vibration spectrum in accordance with the present invention.

As shown in FIG. 3, the process for determining a deviation severity value for a whole test spectrum begins by comparing the test spectrum 30 to an alarm limit envelope 32, both of which are functions of vibration amplitude versus vibration frequency. Typically, vibration amplitude is expressed in units of vibration velocity (inches per second (ips)), although vibration amplitude may also be expressed as displacement (inches) or acceleration (g's). Vibration frequency is order-normalized by dividing the vibration frequency in Hertz by the machine running speed in revolutions per second. Order-normalization of the frequency insures that if the speed of the envelope is different from that of the test spectrum, then the features around which the envelope are shaped are associated with the correct peaks in the test spectrum.

Only identified test vibration peaks are compared to the envelope limit, since they contain the useful information about a potential fault. The sides of peaks and regions between spectral peaks are not tested against the envelope limit. This individual consideration of each precisely located peak compared to its own envelope alarm limit helps to prevent false alarms.

The process selects the n largest-amplitude peaks within the test spectrum to be considered in determining a severity value for the spectrum, as shown generally at 34. In a preferred embodiment of the invention, the value of n is 75, although the exact value of n is not critical to the process. Upon comparison of the n largest peaks to the corresponding envelope levels for those peaks (shown generally at 36), if any of the n peaks penetrate the envelope, then the peak excess, that is, the difference between the deviating peak level and the envelope level is determined.

With continued reference to FIG. 3, the severity of the peak excess is evaluated using two different parameters: (1) the absolute amplitude deviation (AAD) 38, as expressed by:

$$AAD = PVE - AL \qquad (1)$$

where PVL is the peak vibration level, and AL is the alarm limit envelope level, and (2) the peak-to-envelope ratio (PTER) 36 which compares the value of the peak to the envelope value, as expressed by:

$$PTER = \frac{PVL}{AL}. \qquad (2)$$

Using these two parameters, which take into account the magnitude of the peak excess as well as the ratio of the peak excess to the limit level, the process determines a severity value which effectively evaluates both large and small amplitude peaks.

In determining a severity value based upon AAD, AAD is normalized by a frequency-dependent normalization factor, FDNF. The value of FDNF is determined using a heuristically-defined piece-wise function, where the independent variable is vibration frequency and FDNF is the dependent variable. If the frequency is 4.8 Hz or less, then FDNF is expressed as a displacement of 0.00352 inch. If the frequency of the peak vibration level under evaluation is greater than 4.8 Hz but less than 10 kHz, then FDNF is determined by a six-segment piece-wise linear function of frequency, and is expressed in units of velocity. The segments of this piece-wise function are expressed as follows:

$$FDNF_1(FREQ) = 0.106 + \left( \frac{FREQ - 4.8}{5.2} \times 0.106 \right) \qquad (3)$$

for $4.8 \leq FREQ < 0.8 \times MRPS$, where FREQ is the frequency of the vibration peak in Hertz, and where MRPS is the machine rotational speed in revolutions per second;

$$FDNF_2(FREQ) = 0.212 \qquad (4)$$

for $0.8 \times MRPS \leq FREQ < 1000$;

$$FDNF_3(FREQ) = 0.212 - \left( \frac{FREQ - 1000}{1000} \times 0.0706 \right) \qquad (5)$$

for $1000 \leq FREQ < 2000$;

$$FDNF_4(FREQ) = 0.1414 - \left( \frac{FREQ - 2000}{2000} \times 0.0707 \right) \qquad (6)$$

for $2000 \leq FREQ < 4000$;

$$FDNF_5(FREQ) = 0.0707 - \left( \frac{FREQ - 4000}{3000} \times 0.03535 \right) \qquad (7)$$

for $4000 \leq FREQ < 7000$; and $$FDNF_6(FREQ) = 0.03535 - \left( \frac{FREQ - 7000}{3000} \times 0.02665 \right) \qquad (8)$$

for $7000 \leq FREQ < 10000$. If the frequency of the peak vibration level under evaluation is greater than 10 KHZ, then FDNF is expressed as an acceleration of 1.42 g's.

Figure 8:
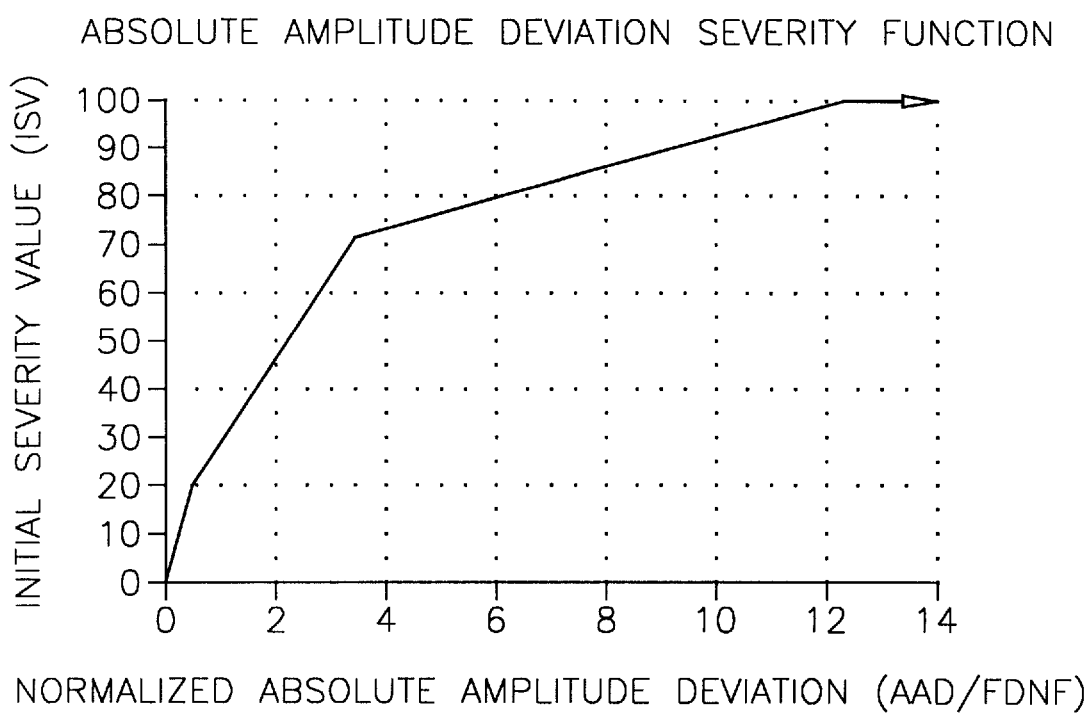
FIG. 8 is a graph of the absolute amplitude deviation severity function.

After the determination of FDNF, a three-segment linear piece-wise function, as shown in FIG. 8, is used to determine an initial severity value, ISV, as a function of the ratio of AAD to FDNF for each of the selected deviating peaks within the test spectrum (indicated generally at 40 in FIG. 3). In a preferred embodiment of the invention, ISV is expressed as a percentage between 0 and 100. The nature of the ISV(AAD) function attempts to provide sensitivity to variations in the magnitude of AAD over the range of vibration levels which are barely in excess of the alarm limit envelope, as well as to extreme AAD levels. The function provides enhanced sensitivity where the AAD is less than half of the allowable limit defined by the limit envelope. When AAD is between one-half to three and one-half times the allowable limit, the function is moderately sensitive. For values of AAD greater than three and one-half times the allowable limit, but less than twelve and one-half times the allowable limit, sensitivity is reduced since the fault is already assumed to be severe when it falls in this region of the severity function. This function is expressed as follows:

$$ISV(AAD)=(SLOPE \times AAD)+CON \quad (9)$$

where in the first segment, CON=0.0, and $$SLOPE = \frac{20.0}{ACRT1} \quad (10)$$

for $0 < AAD \leq ACRT1$, where $$ACRT1=FDNF \times AMLT(1) \quad (11)$$

and where AMLT(1)=0.5. In the second segment of the ISV piece-wise function, $$SLOPE = \frac{50.0}{ACRT2 - ACRT1} \quad (12)$$

and $$CON=70.0-(ACRT2 \times SLOPE) \quad (13)$$

for $ACRT1 < AAD \leq ACRT2$, where $$ACRT2=FDNF \times AMLT(2) \quad (14)$$

and AMLT(2)=3.5. In the third segment of the ISV function, $$SLOPE = \frac{30.0}{ACRT3 - ACRT2} \quad (15)$$

and $$CON=100.0-(ACRT3 \times SLOPE) \quad (16)$$

for $ACRT2 < AAD \leq ACRT3$, where $$ACRT3=FDNF \times AMLT(3) \quad (17)$$

and AMLT(3)=12.5. For ACRT3<AAD, SLOPE=0.0 and CON=100.

Figure 7:
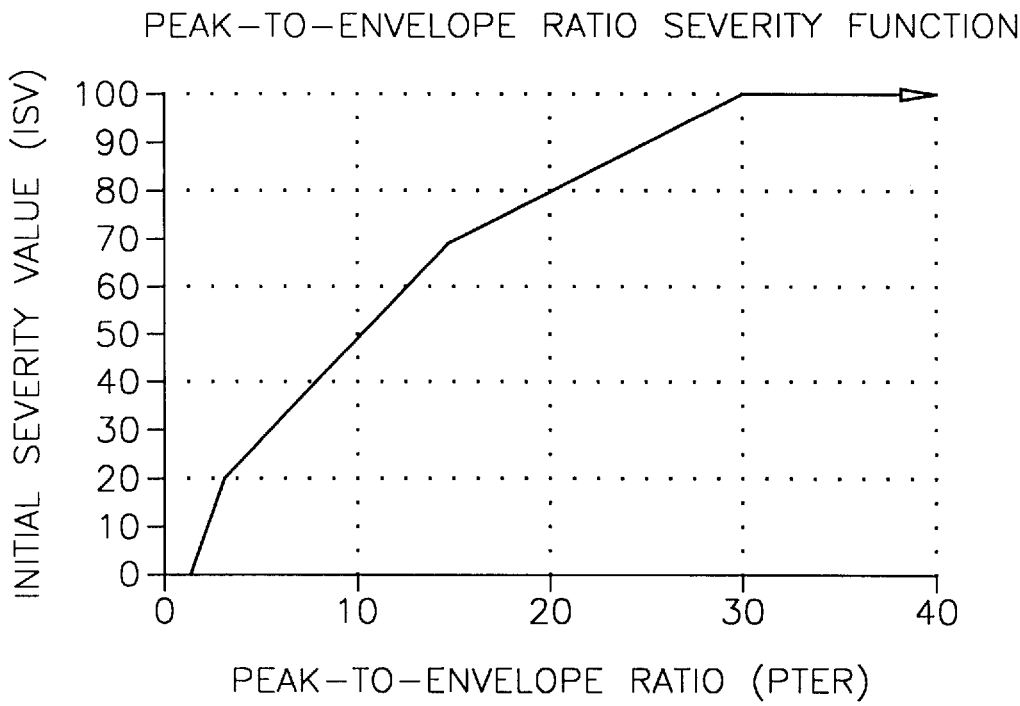
FIG. 7 is a graph of the peak-to-envelope ratio severity function.

The process next determines second initial severity value for each of the selected deviating peaks within the vibration spectrum (indicated generally at 46), this one a function of PTER. This ISV value is also determined using a three-segment linear piece-wise function, as shown in FIG. 7. This function is expressed as:

$$ISV(PTER)=(SLOPE \times PTER)+CON \quad (18)$$

where in the first segment, $$SLOPE = \frac{20.0}{BCRT(1) - 1.0} \quad (19)$$

and $$CON=20.0-(BCRT(1) \times SLOPE) \quad (20)$$

for $1 < PTER \leq BCRT(1)$, where BCRT(1)=3; and where in the second segment, $$SLOPE = \frac{50.0}{BCRT(2) - BCRT(1)} \quad (21)$$

and $$CON=70.0-(BCRT(2) \times SLOPE) \quad (22)$$

for $BCRT(1) < PTER \leq BCRT(2)$, where BCRT(2)=15; and where in the third segment $$SLOPE = \frac{30.0}{BCRT(3) - BCRT(2)} \quad (23)$$

and $$CON=100.0-(BCRT(3) \times SLOPE) \quad (24)$$

for $BCRT(2) \leq PTER \leq BCRT(3)$, where BCRT(3)=30. For $BCRT(3) \leq PTER$, SLOPE=0.0 and CON=100.0.

With continued reference to FIG. 3, the severity determination process next chooses the largest ISV(AAD) value of all those calculated for the selected peaks, and the largest value of ISV(PETR) of all those calculated for the selected peaks, as indicated generally at 42 and 48:

$$ISV_{max}(AAD)=\max(ISV_1(AAD), ISV_2(AAD), \ldots ISV_m(AAD)) \quad (25)$$

$$ISV_{max}(PTER)=\max(ISV_1(PTER) ISV_2(PTER), \ldots ISV_m(PTER)) \quad (26)$$

where m is the number of deviating vibration peaks. The larger of $ISV_{max}(AAD)$ and $ISV_{max}(PTER)$ is then selected as the initial severity value for the test spectrum (indicated generally at 50):

$$ISV=\max(ISV_{max}(PTER), ISV_{max}(AAD)). \quad (27)$$

Since the deviation severity value for a complete spectrum should take into account all of the m deviating peaks in the spectrum, one percent is added to the initial severity value for each of the other peaks in the test spectrum which exceed the limit envelope, up to a maximum of 10 percent added. As indicated generally at 52, the final severity value, SV, assigned to the test vibration spectrum is expressed as:

$$SV=ISV+\min(m-1,10) \quad (28)$$

where m is an integer value representing the total number of deviating peaks within a test spectrum. For example, if five vibration peaks exceed the limit envelope, and the largest ISV is determined to be 34%, then the final severity value for the spectrum is 34+(5-1)=38%.

This measure of severity gives the operator a quantitative measure of the operating condition of the machine on which the spectral data was taken. Based upon this value, the operator decides whether to more closely analyze the data associated with the machine, to remove the machine from service to initiate immediate repair, or to simply disregard the exceptional data. The operator also ranks the severity value against severity values of other machines so that the relative priority that should be assigned to the maintenance of the machine may be determined. The operator also compares the machine's severity value against previously-determined severity values for the same machine to evaluate any trends in the machine's vibration characteristics.

As mentioned previously, this process can also be applied over a subset of the vibration peaks within the test spectrum to determine a deviation severity value for a complex spectral feature. For example, the deviation severity of the subsynchronous region of the spectrum may be determined by applying this technique only to the peaks located in that region. The deviation severity of individual peaks known to be associated with a particular machine fault also may be determined. Similarly, the deviation of a harmonic family of peaks that are associated with a known fault frequency, as is the case with a bearing defect, can also be given an individual measure of severity. The deviation severity of a sideband family of peaks may also be analyzed using the process of the present invention. Knowing the individual severities of complex features that are associated with machinery fault conditions aids in determining the type of fault that is present, as well as its severity.

Figure 4:
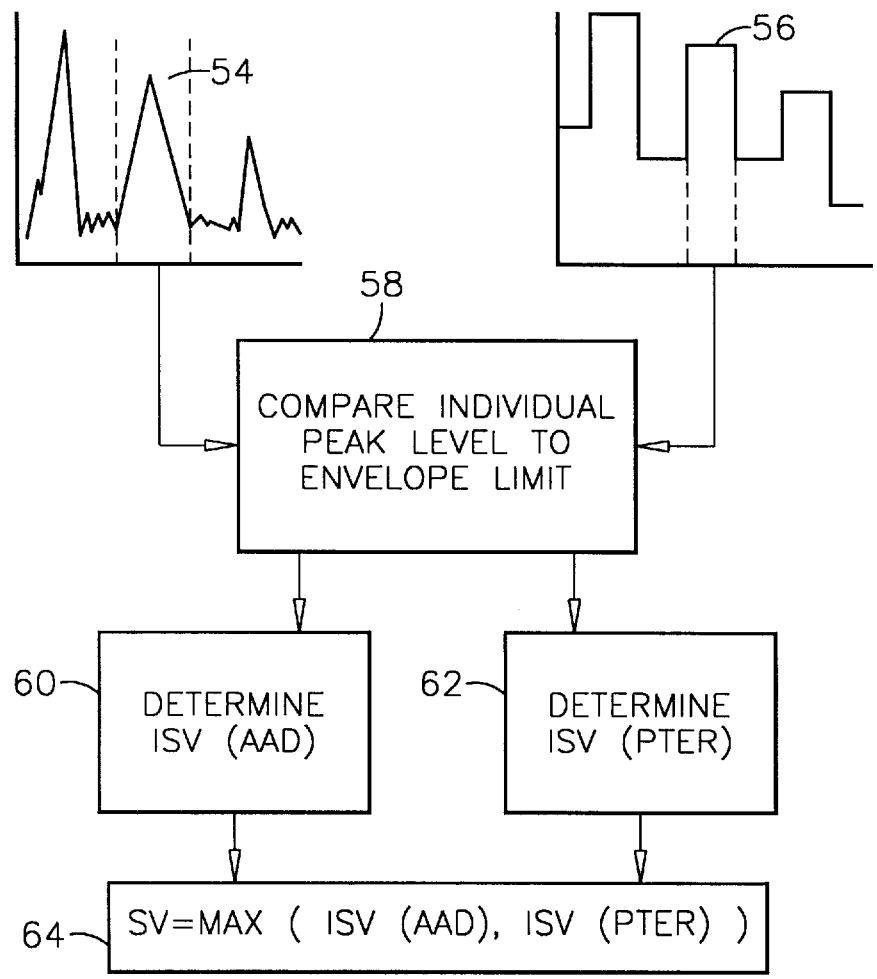
FIG. 4 is a flow diagram of a process for determining deviation severity for an individual peak within a vibration spectrum in accordance with the present invention.

The process as applied to an individual deviating vibration peak is represented in FIG. 4. In this situation, an individual peak 54 in a test spectrum is compared to an envelope limit level 56 corresponding to the peak. ISV (AAD) is calculated for the peak according to equation (9), ISV(PTER) is calculated for the peak according to equation (18), and the larger of these two values is selected as the deviation severity value of the peak, as indicated at 64.

Figure 5:
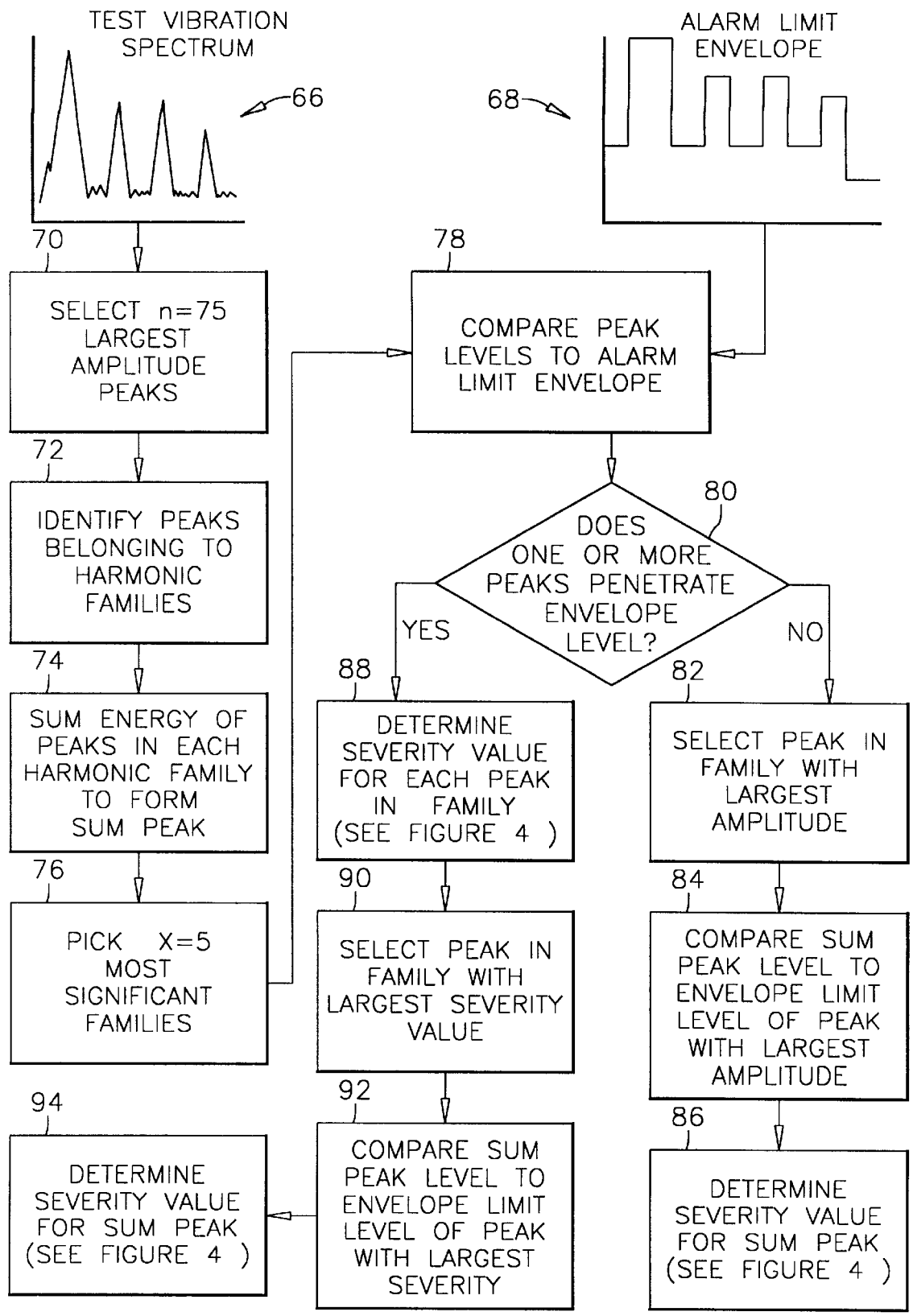
FIG. 5 is a flow diagram of a process for determining deviation severity for a family of harmonic peaks within a vibration spectrum in accordance with the present invention.

The process of the invention as applied to a harmonic family of peaks within a spectrum is represented in FIG. 5. As indicated at 70, a preferred embodiment of this process operates on the 75 largest-magnitude peaks in the spectrum. The process compares the frequencies of the peaks and groups the peaks having integer-multiple frequencies into harmonic families (indicated generally at 72). The energy level of each peak within a family is then summed together (indicated at 74) to create a harmonic sum peak. The process then selects a certain number of harmonic families (indicated at 76), five in the preferred embodiment, whose deviation severities are further analyzed. This selection is based on the number of peaks within a family and the total amount of energy represented in the family. As indicated at 78, the peak levels of the individual peaks in a harmonic family are compared to the alarm limit envelope 68. If no individual peak in a family exceeds the limit envelope, then the amplitude of the harmonic sum peak is compared to the envelope level corresponding to the largest amplitude peak in the family (indicated at 84). If the harmonic sum peak exceeds that envelope level, then a deviation severity value is determined using the single-peak process described previously (as represented in FIG. 4).

With continued reference to FIG. 5, if one or more individual peaks within the harmonic family exceeds limit envelope, then deviation severity values are determined for each deviating peak in the family. As indicated at 90 and 92, the envelope limit level of the peak having the largest deviation severity value is compared against the harmonic sum peak. If the harmonic sum peak exceeds that envelope level, then a deviation severity value is determined using the single-peak process described above (as represented in FIG. 4).

Figure 6:
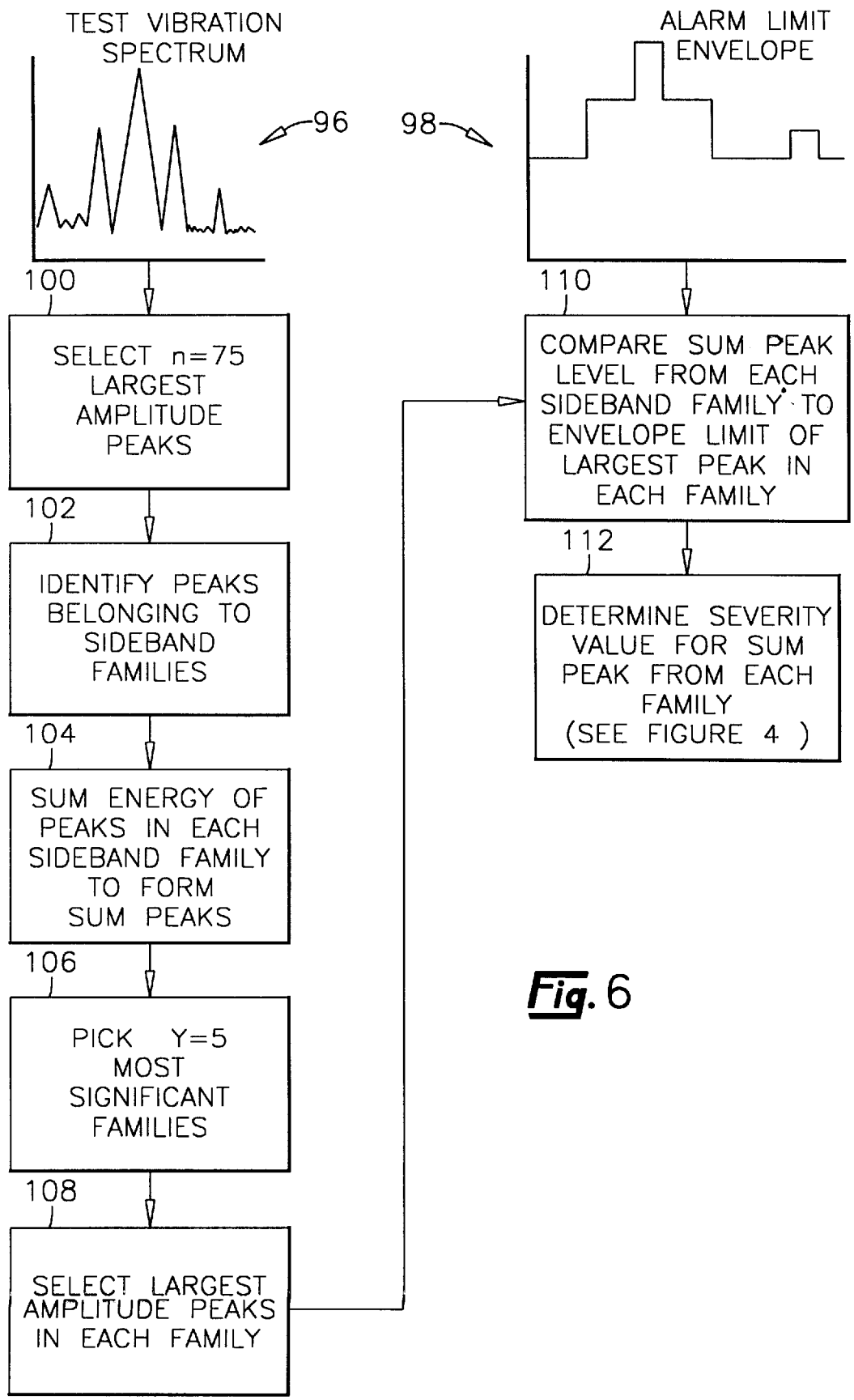
FIG. 6 is a flow diagram of a process for determining deviation severity for a family of sideband peaks within a vibration spectrum in accordance with the present invention.

The process of the invention as applied to a sideband family of peaks within a spectrum is represented in FIG. 6. As indicated at 100, a preferred embodiment of this process operates on the 75 largest-magnitude peaks in a test spectrum 96. The process compares the frequencies of the peaks, and groups the peaks which are sidebands of a common spectral feature into sideband families (indicated generally at 102). The energy level of each peak within a sideband family is then summed together (indicated at 104) to create a sideband sum peak. The process then selects a certain number of sideband families (indicated at 106), five in the preferred embodiment, whose deviation severities are further analyzed. This selection is based on the number of peaks within a family and the total amount of energy represented in the family. As indicated at 108, the largest amplitude peak within the sideband family is determined, and the alarm limit envelope level 98 corresponding to that peak is designated as the limit for the sideband sum peak. The amplitude of the sideband sum peak is then compared to the envelope level corresponding to the largest amplitude peak in the family (indicated at 110). If the sideband sum peak exceeds that envelope level, then a deviation severity value is determined using the single-peak process described previously (as represented in FIG. 4).

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method of evaluating the operational condition of a machine when the machine's vibration spectrum deviates from an acceptable state, the acceptable state being defined by an alarm limit envelope, the method comprising the steps of:

determining the vibration spectrum of the machine, the vibration spectrum characterizing an operational condition of the machine;

determining the alarm limit envelope which represents a maximum vibration level above which a peak in the machine's vibration spectrum is considered abnormal;

comparing the amplitude of individual peaks within the machine's vibration spectrum to the alarm limit envelope; and determining a deviation severity value based upon said comparing, the deviation severity value characterizing the severity of deviation from an acceptable state when at least one individual peak within the machine's vibration spectrum exceeds the alarm limit envelope, said determining comprising the following steps:

determining the peak excess magnitude for each vibration peak within the machine's vibration spectrum, the peak excess magnitude being the amount by which the amplitude of each deviating vibration peak within the machine's vibration spectrum exceeds the alarm limit envelope level;

determining the ratio of the peak excess magnitude to the alarm limit envelope level; and evaluating the deviation severity value for the machine's vibration spectrum based upon both the peak excess magnitude and the ratio of the peak excess magnitude to the limit envelope level.

2. The method of claim 1 wherein the deviation severity value is a percentage between zero and one hundred inclusive.

3. The method of claim 1 wherein said evaluating the deviation severity value for the machine's vibration spectrum further comprises the following steps:

determining a magnitude deviation severity value for each deviating peak vibration level within the machine's vibration spectrum based upon the peak excess magnitude;

determining a ratio deviation severity value for each deviating peak vibration level within the machine's vibration spectrum based upon the ratio of the peak excess magnitude to the limit envelope level;

selecting the larger of the magnitude deviation severity value and the ratio deviation severity value as the deviation severity value to characterize the deviation severity for each deviating peak vibration level;

choosing the largest of all deviation severity values which have been selected by said selecting step as the initial deviation severity value; and adding the smaller of m-1 percent and ten percent to the initial deviation severity value, the resulting sum being the final deviation severity value which characterizes the deviation severity for the machine's vibration spectrum, where m is the total number of deviating peak vibration levels in the machine's vibration spectrum.

4. A method of evaluating the operational condition of a machine when the machine's vibration spectrum deviates from an acceptable state, the acceptable state being defined by an alarm limit envelope, the method comprising the steps of:

determining the vibration spectrum of the machine, the vibration spectrum characterizing an operational condition of the machine;

determining the alarm limit envelope which represents a maximum vibration level above which a peak in the machine's vibration spectrum is considered abnormal;

comparing the amplitude of individual peaks within the machine's vibration spectrum to the alarm limit envelope; and determining a deviation severity value based upon said comparing, the deviation severity value characterizing the severity of deviation from an acceptable state when at least one individual peak within the machine's vibration spectrum exceeds the alarm limit envelope, said determining comprising the following steps:

determining the peak excess magnitude for each vibration peak within the machine's vibration spectrum, the peak excess magnitude being the amount by which the amplitude of each deviating vibration peak within the machine's vibration spectrum exceeds the alarm limit envelope level;

normalizing the peak excess magnitude with a normalization factor, the value of the normalization factor being dependent on the frequency of the vibration peak; and evaluating the deviation severity value for the machine's vibration spectrum based at least in part upon the normalized peak excess magnitude.

5. A method of evaluating the operational condition of a machine when the machine's vibration spectrum deviates from an acceptable state, the acceptable state being defined by an alarm limit envelope, the method comprising the steps of:

determining the vibration spectrum of the machine, the vibration spectrum characterizing an operational condition of the machine;

determining the alarm limit envelope which represents a maximum vibration level above which a peak in the machine's vibration spectrum is considered abnormal;

selecting individual vibration peaks within the machine's test vibration spectrum, the frequencies of the selected vibration peaks being integer multiples of each other;

summing the energy levels associated with the selected vibration peaks, resulting in a sum peak level;

comparing the amplitude of the sum peak level to the alarm limit envelope; and determining a deviation severity value based upon said comparing, the deviation severity value characterizing the severity of the deviation of the machine's operational condition from an acceptable state.

6. A method of evaluating the operational condition of a machine when the machine's vibration spectrum deviates from an acceptable state, the acceptable state being defined by an alarm limit envelope, the method comprising the steps of:

determining the vibration spectrum of the machine, the vibration spectrum characterizing an operational condition of the machine;

determining the alarm limit envelope which represents a maximum vibration level above which a peak in the machine's vibration spectrum is considered abnormal;

selecting individual vibration peaks within the machine's test vibration spectrum, the selected vibration peaks being related to each other as sideband peaks;

summing the energy levels associated with the selected vibration peaks, resulting in a sum peak level;

comparing the amplitude of the sum peak level to the alarm limit envelope; and determining a deviation severity value based upon said comparing, the deviation severity value characterizing the severity of the deviation of the machine's operational condition from an acceptable state.

7. A programmable apparatus for evaluating the operational condition of a machine when the machine's vibration spectrum deviates from an acceptable state, the acceptable state being defined by an alarm limit envelope, the apparatus comprising:

a memory which receives and stores a data set representing the alarm limit envelope, and which receives and stores a data set representing the machine's vibration spectrum;

a processor which receives the data set representing the alarm limit envelope from said memory, receives the data set representing the machine's vibration spectrum from said memory, compares the amplitude of individual peaks within the machine's vibration spectrum to the alarm limit envelope spectrum, and determines a deviation severity value representing the severity of deviation when at least one individual peak within the machine's vibration spectrum exceeds the alarm limit envelope, said processor determining the deviation severity value by determining the peak excess magnitude for each vibration peak within the machine's vibration spectrum, the peak excess magnitude being the amount by which the amplitude of each deviating vibration peak within the machine's vibration spectrum exceeds the alarm limit envelope level, determining the ratio of the peak excess magnitude to the alarm limit envelope level, and evaluating the deviation severity value for the machine's vibration spectrum based upon both the peak excess magnitude and the ratio of the peak excess magnitude to the limit envelope level.

8. A programmable apparatus for evaluating the operational condition of a machine when the machine's vibration spectrum deviates from an acceptable state, the acceptable state being defined by an alarm limit envelope, the apparatus comprising:

a memory which receives and stores a data set representing the alarm limit envelope, and which receives and stores a data set representing the machine's vibration spectrum;

a processor which receives the data set representing the alarm limit envelope from said memory, receives the data set representing the machine's vibration spectrum from said memory, compares the amplitude of individual peaks within the machine's vibration spectrum to the alarm limit envelope spectrum, and determines a deviation severity value representing the severity of deviation when at least one individual peak within the machine's vibration spectrum exceeds the alarm limit envelope, said processor determining the deviation severity value by determining the peak excess magnitude for each vibration peak within the machine's vibration spectrum, the peak excess magnitude being the amount by which the amplitude of each deviating vibration peak within the machine's vibration spectrum exceeds the alarm limit envelope level, normalizing the peak excess magnitude with a normalization factor, the value of the normalization factor being dependent on the frequency of the vibration peak, and evaluating the deviation severity value for the machine's vibration spectrum based at least in part upon the normalized peak excess magnitude.

9. A computer-readable storage device which stores instructions for a processor, the instructions directing the processor in the evaluation of the operational condition of a machine by directing the processor to compare the function of vibration amplitude versus vibration frequency of individual peaks within the machine's vibration spectrum to an alarm limit envelope, the alarm limit envelop defining an acceptable operational state of the machine, and directing the processor to determine a deviation severity value which represents the severity of deviation when at least one individual peak with the machine's vibration spectrum exceeds the alarm limit envelope.

* * * * *